(12) United States Patent
Dorety

(10) Patent No.: US 7,090,104 B2
(45) Date of Patent: Aug. 15, 2006

(54) VEHICLE HITCH SUPPORT FOR TABLES AND OTHER ACCESSORIES

(76) Inventor: Joseph A. Dorety, 3774 Colony Cove Trail, Jacksonville, FL (US) 32277

( * ) Notice: Subject to any disclaimer, the term of this patent is extended or adjusted under 35 U.S.C. 154(b) by 594 days.

(21) Appl. No.: 10/156,156

(22) Filed: May 28, 2002

(65) Prior Publication Data

US 2003/0057244 A1 Mar. 27, 2003

Related U.S. Application Data

(60) Provisional application No. 60/324,994, filed on Sep. 26, 2001.

(51) Int. Cl.
*B60R 11/00* (2006.01)
(52) U.S. Cl. .......................... 224/524; 224/519; 108/4
(58) Field of Classification Search ................ 224/519, 224/521, 524, 526; 108/4
See application file for complete search history.

(56) References Cited

U.S. PATENT DOCUMENTS

| | | | | |
|---|---|---|---|---|
| 2,594,319 A | * | 4/1952 | Law | .......................... 224/42.32 |
| 4,202,562 A | * | 5/1980 | Sorenson | ................. 280/415.1 |
| 4,938,399 A | * | 7/1990 | Hull et al. | ................... 224/521 |
| 5,211,526 A | * | 5/1993 | Robinette | .................... 414/550 |
| 5,368,209 A | * | 11/1994 | Hill | ............................. 224/497 |
| 5,752,639 A | * | 5/1998 | Rice | ............................ 224/521 |
| 5,857,741 A | | 1/1999 | Anderson | |
| 5,938,092 A | * | 8/1999 | Johnson | ....................... 224/521 |
| 6,036,417 A | * | 3/2000 | Weaver | ........................ 410/7 |
| 6,077,007 A | * | 6/2000 | Porter et al. | ................ 410/140 |
| 6,082,269 A | * | 7/2000 | Padberg | ........................ 108/44 |
| 6,155,623 A | * | 12/2000 | Lane | ....................... 296/26.09 |
| 6,189,458 B1 | * | 2/2001 | Rivera | .......................... 108/44 |
| 6,202,909 B1 | * | 3/2001 | Belinky et al. | ............. 224/524 |
| 6,314,891 B1 | | 11/2001 | Larson | |
| 6,336,413 B1 | | 1/2002 | Ball | |
| 6,378,748 B1 | * | 4/2002 | Cox | ............................ 224/511 |
| 6,511,088 B1 | * | 1/2003 | Kahlstorf | ................. 280/415.1 |
| 6,732,892 B1 | * | 5/2004 | Mangrum | .................... 224/401 |

* cited by examiner

*Primary Examiner*—Stephen K. Cronin
(74) *Attorney, Agent, or Firm*—Thomas C. Saitta

(57) ABSTRACT

A combination table and support member assembly for use in connection with a trailer hitch mounted onto a vehicle, where the support member and table can be joined in various configurations to vary the table height when in use and to vary the lateral separation distance between the rear of the vehicle and the table and vertical components of the support member when in use or in transport to allow for sufficient distance to enable utilization of the tailgate, rear door or hatchback of the vehicle. Extension members may also be utilized to alter the configuration.

15 Claims, 5 Drawing Sheets

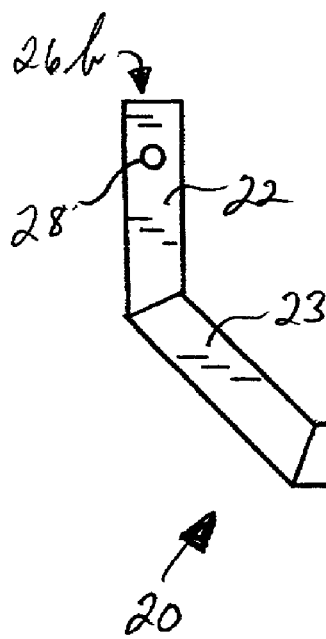
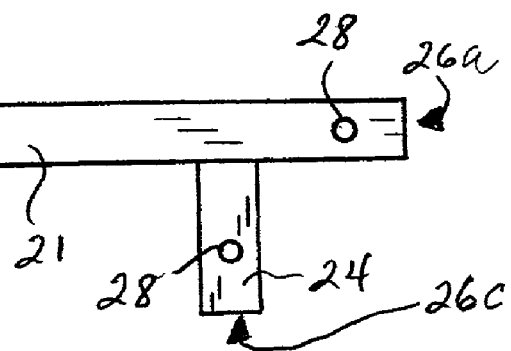
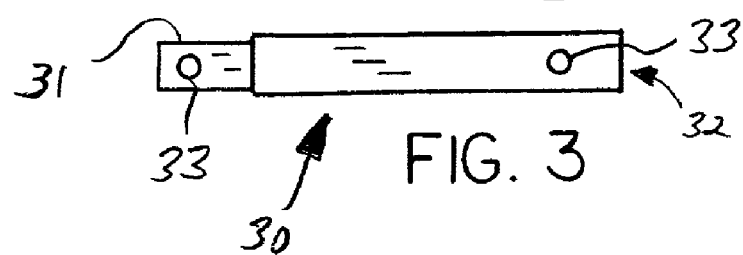
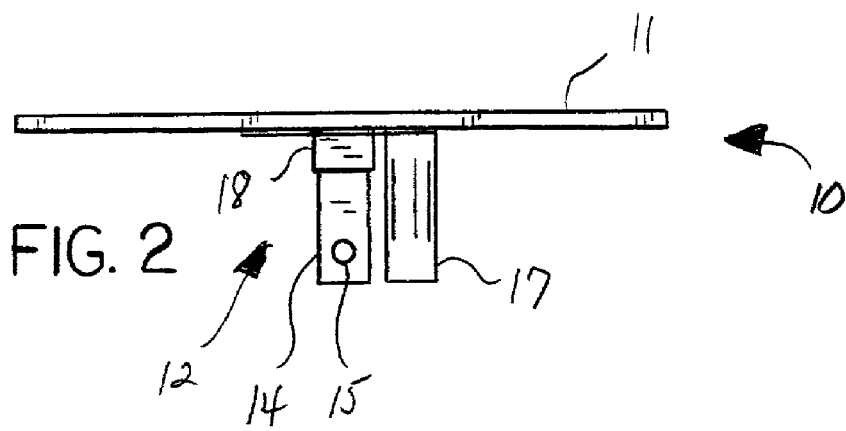

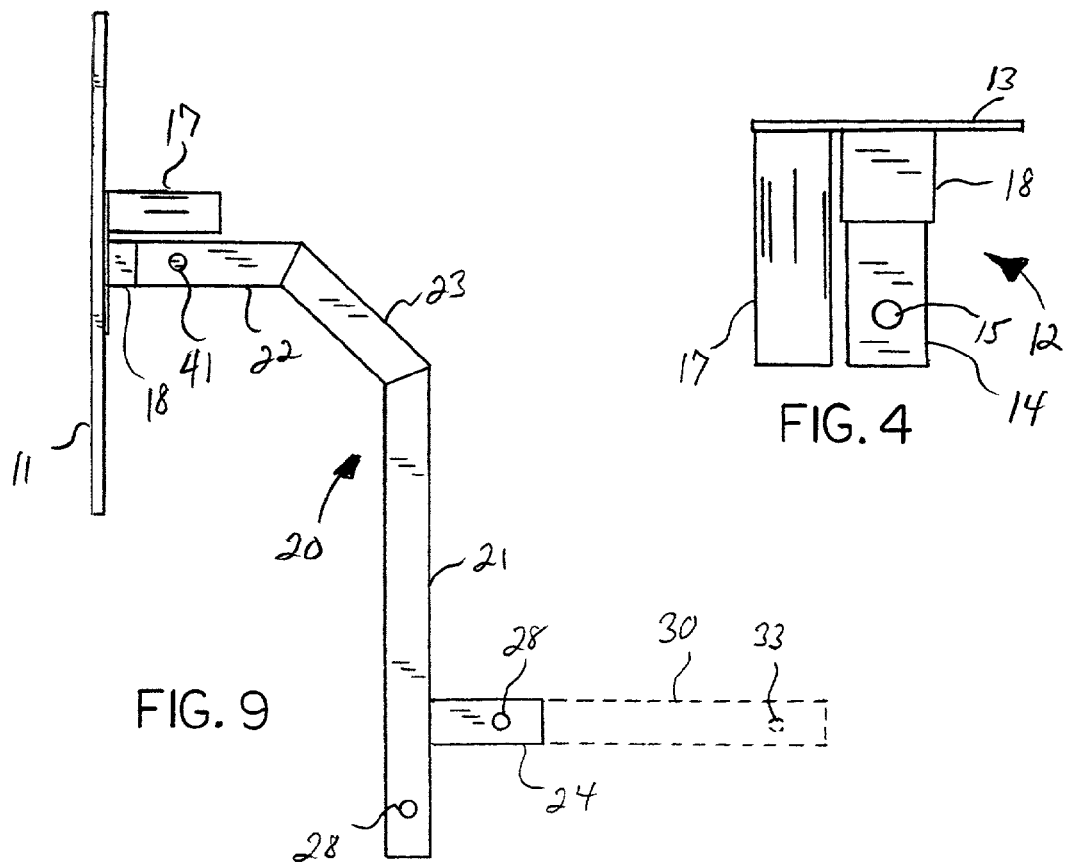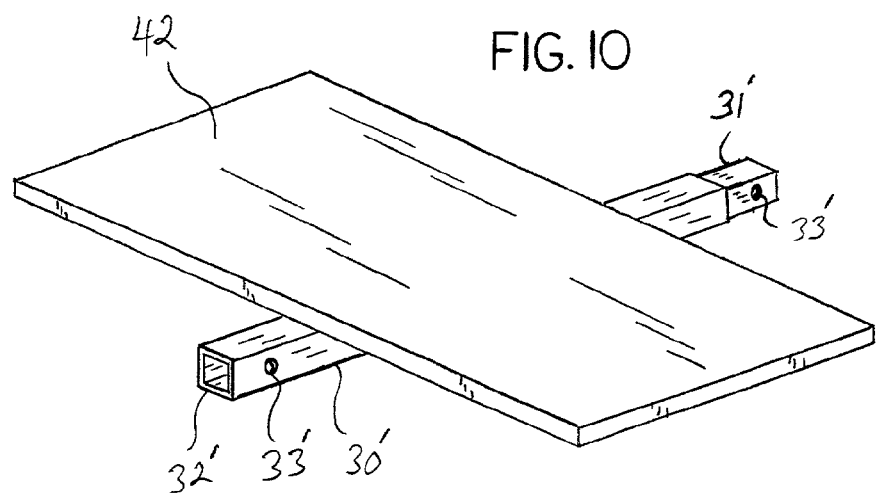

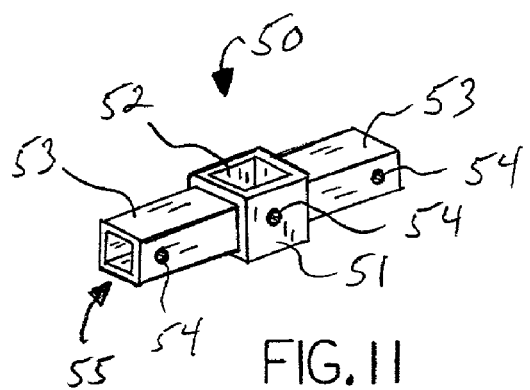
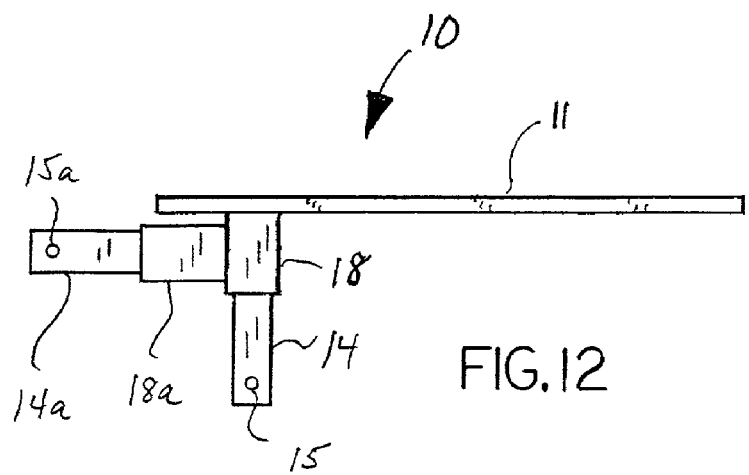

VEHICLE HITCH SUPPORT FOR TABLES AND OTHER ACCESSORIES

This application claims the benefit of U.S. Provisional Application Ser. No. 60/324,994, filed Sep. 26, 2001.

BACKGROUND OF THE INVENTION

This invention relates generally to the field of accessories and supports which are temporarily connected to a vehicle trailer hitch for transport behind a vehicle, and more particularly to the field of tables and related objects which can be temporarily mounted into a vehicle hitch for transport and for use, where the accessory support is provided with multiple coupling means such that the configuration of the accessory and support relative to the vehicle can be varied.

Many vehicles are provided with rear-mounted trailer hitches which are used for the temporary connection of a wheeled trailer to the vehicle. The hitches are securely joined to the frame or chassis of the vehicle and are formed as a square-in-cross-section tube or column with typical inner dimensions of two inches by two inches or 1.25 inches by 1.25 inches. A pin receiving opening or locking aperture is provided to receive a locking pin. The wheeled trailer is provided with a mounting tongue or post which is typically formed as square-in-cross-section tube with a thickness of 0.125 to 0.25 inches and outer dimensions of two inches by two inches, whereby the mounting tongue receives the hitch in a relatively snug manner to be secured by insertion of a locking pin. Such hitch assemblies are well known.

In many circumstances vehicle owners will transport tables, cooking grills, umbrellas or the like for use in tailgating or picnicking. The storage capacity of the vehicle limits the size and type of table, grill, etc., which can be transported, and the table, grill, etc., occupies space during transport which limits the amount of other items which can be transported.

When the vehicle trailer hitch is not connected to a trailer, it provides a mounting means for connecting other objects to the vehicle in a secure and stable manner. It is an object of this invention to provide a table assembly which can be removably mounted on the rear of a vehicle by temporarily connecting a support member to the trailer hitch of the vehicle. It is a further object of this invention to provide such a table assembly which may be arranged in various configurations, such that the table can be both transported behind the vehicle or used while attached to the vehicle. It is a further object of this invention to provide a unique structure to the support member, such that the location of the table relative to the vehicle and to the ground can be varied among several possible configurations. It is a further object to provide such a table assembly where the height of the table from the ground can be varied and where the distance of the table from the rear of the vehicle can be varied, both when in use and when in the transport condition, to allow sufficient space to allow for the vehicle tailgate, rear door or hatch to be opened. It is a further object to provide such a table assembly where provision is made to receive an umbrella, grill, flag pole or the like, and further where provision is made on the support member or extension support members for securing other objects, such as a cooler or chairs.

SUMMARY OF THE INVENTION

The invention comprises a combination table and support member assembly for temporary connection to a vehicle-mounted trailer hitch, where the table and support member can be arranged in plural configurations both during transport and use, such that the height of the table from the ground and the lateral separation distance of the table and vertical portion of the support member from the rear of the vehicle can be varied, such that in certain configurations, both when in use and in transport, the tailgate, rear door or hatch of the vehicle is not blocked by the table or support member, or an externally mounted spare tire is accounted for. The table is provided with a table mounting bracket which allows it to be removably connected to one of two receiving openings of the support member, the receiving opening of the transport segment, or the receiving opening of an extension member. The support member is constructed to have a first segment joined to a shorter second segment, the second segment being disposed perpendicularly to the first segment. A bridging member, preferably at an angle of 45 degrees, joins the first segment to the second segment. A short transport segment is mounted perpendicularly to the first segment opposite to the second segment. Both ends of the support member, the free end of the transport segment and one end of the extension member terminate in a square-profile receiving opening, all of equal size and appropriately sized to receive in mating manner the square-profile insertion end of a typical vehicle trailer hitch. Locking apertures and locking pins are provided to secure the individual components to each other or to the vehicle trailer hitch.

The table is preferably provided with a pole receiving aperture and pole receiving tube to allow the pole of an umbrella to be inserted there through. Optionally, a platform, grate or other object-receiving structure may be provided on either the side of the first segment opposite to the transport segment or on an extension member of suitable length, to allow a grill, cooler, lawn chairs, etc., to be secured for transport or use.

The table and support member assembly can be configured in multiple configurations with either the first segment, second segment or extension member directly connected to the vehicle trailer hitch. The particular segment or extension member chosen determines the lateral separation distance of the vertical component of the support member from the rear of the vehicle and determines the height of the table when in use.

BRIEF DESCRIPTION OF THE DRAWINGS

FIG. 1 is a side view of the support member.

FIG. 2 is a side view of the table and table mounting bracket.

FIG. 3 is a side view of the extension member.

FIG. 4 is a side view of the table mounting bracket.

FIG. 9 is a side view showing the support member and table assembly in an alternative configuration for transport only, where either the transport segment or the extension member, shown in dashed lines, is to be connected to the vehicle trailer hitch.

FIG. 10 is a perspective view of an alternative extension member to which is connected a platform member for securing other objects.

FIG. 11 is a perspective view of mounting sleeve member which is adapted to mount onto the support member.

FIG. 12 is an alternative construction for the table assembly.

DETAILED DESCRIPTION OF THE INVENTION

Figure 5:
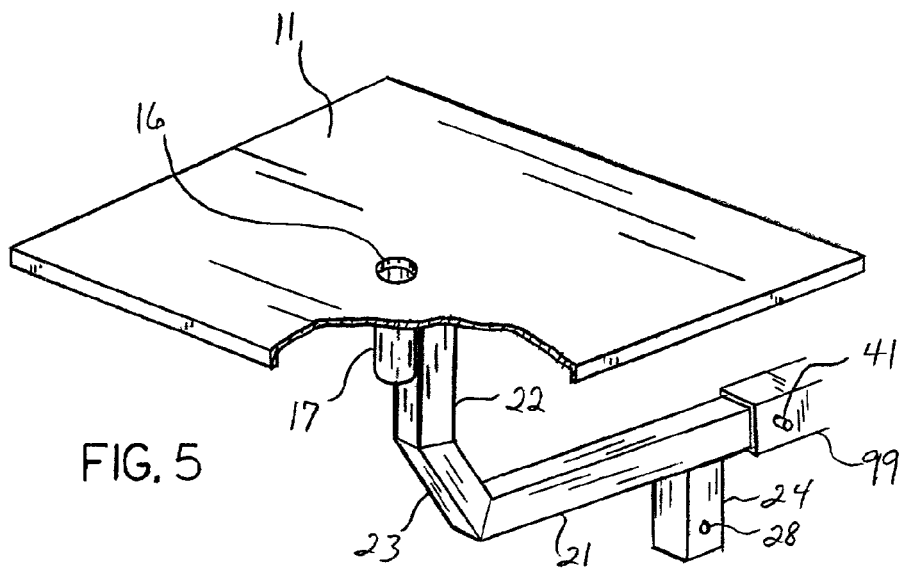
FIG. 5 is a perspective view showing the table and support member connected to a vehicle trailer hitch, with the table in the use position.

With reference to the drawings, the invention will be defined with regard for the best mode and the preferred embodiments. In a most general sense, the invention is an assembly or combination of an accessory assembly, such as a table, which is joined to a support member which can be temporarily mounted onto the trailer hitch of a vehicle, whereby the support member is provided with multiple coupling means such that the position of the support member relative to the vehicle may be altered depending on the particular coupling means utilized. While the invention primarily involves a table or other horizontal support surface, the accessory may comprise a grill, bicycle rack, fishing pole rack, surfboard rack, canoe support, flag pole mount, motorcycle rack, etc.

As shown in side view in FIG. 1, the trailer hitch support member 20 comprises a first segment 21 and a second segment 22, most preferably joined by a bridging segment 23, although it is also possible to connect the first segment 21 to the second segment 22 at a right angle or in a curved manner. The first segment 21 and second segment 22 are positioned perpendicularly to each other, with the bridging segment 23 disposed at a 45 degree angle relative to the first segment 21 and second segment 22. First segment 21 is of greater length than second segment 22, with first segment 21 being preferably about twenty-one inches in length, second segment 22 being preferably about six and one half inches in length, and bridging segment being preferably about seven inches in length, as measured to the midpoint of the angle cut. Square profile tubing of about two inches by two inches in cross-section and about 0.125 to 0.25 inches in thickness is preferable, when used with a hitch having an interior opening two inches by two inches. For use with a smaller vehicle hitch, the invention is appropriately downsized. A transport segment 24 is attached perpendicularly to the first segment 21 on the side opposite that of the second segment 22 and nearer to the free end of the first segment, preferably centered about six inches from the free end of the first segment, such that the transport segment 24 and the second segment 22 extend in opposite directions. Transport segment 24 is preferably about five inches in length and is likewise a square profile tubing of about two inches by two inches in cross-section and about 0.125 to 0.25 inches in thickness. The components are preferably joined by welding. Locking apertures 28 to receive a locking pin 41 are disposed approximately two inches from the free ends of the first segment 21, second segment 22 and transport segment 24, the free ends defining square profile support member coupling means designated as receiving openings 26a, 26b and 26c. The free ends mate with either the square profile vehicle trailer hitch 99, the insertion end 31 of the extension member 30 or the insertion end 14 of the table assembly 10 and table mounting bracket 12. In other words, the first segment receiving opening 26a, the second segment receiving opening 26b and the transport segment receiving opening 26c and the vehicle trailer hitch 99 are female components, while the free ends of the first segment 21, second segment 22 and transport segment 24, the table assembly insertion end 14 and the extension member insertion end 31 are male components of a male-female coupling structure, such that the male component is inserted into the female component and resides in a relatively snug and secure manner.

The accessory assembly, embodied herein as table assembly 10, is shown in FIG. 2, and comprises a table or horizontal support surface 11 connected to a mounting bracket 12, shown best in FIG. 4. The table 11 may be composed of plastic, aluminum or other suitable material. Table mounting bracket 12 comprises a plate member 13 which abuts the underside of the table 11, and is connected by mechanical fasteners or other suitable means. Extending from the plate member 13 is table coupling means which comprises a shoulder 18 and square profile table insertion member 14, sized to mate with the receiving openings 26a, 26b and 26c of the support member 20 to form in combination a coupling means. Alternatively, the insertion member 14 may be welded or otherwise attached directly to the plate member 13. A locking aperture 15 is disposed in the insertion member 14 which aligns with the locking apertures 28 in the support member 20 to receive a locking pin 41. Most preferably, table assembly 10 further comprises a pole receiving aperture 17, shown in FIG. 5, and a pole receiving tube 17 extending from the plate 13 parallel to the insertion member 14. This provides a means to receive an umbrella pole 98, as shown in FIG. 6, when the table 11 is in the horizontal use position.

An alternative construction for the table assembly 10 is shown in FIG. 12, where a second shoulder 18a is perpendicularly mounted onto shoulder 18, shoulder 18a having a second insertion member 14a and locking aperture 15a connected thereto. Shoulder 18 is not centered on table 11 in this configuration. This mounting structure allows the table assembly 10 to be mounted into either a horizontally disposed or a vertically disposed receiving opening 26a, 26b or 26c on the support member 20, thereby increasing the number of available configurations for the invention. Alternatively, the shoulder 18a may be eliminated and the insertion member 14a attached directly to either shoulder 18 or insertion member 14.

Most preferably an extension member 30 is provided as part of the invention, as shown in FIG. 3. The extension member 30 is a square profile tube having coupling means comprising an insertion member 31 with locking aperture 33 on one end, with the opposite end defining a receiving opening 32 and also having a locking aperture 33 disposed near this opposite end. The insertion member 33 is sized to mate with the receiving openings 26a, 26b and 26c of the support member 20. The extension member receiving opening 32 is sized to mate with the trailer hitch 99 or the table insertion member 14. A suitable length for extension member 30 is approximately one foot, although many other lengths may be utilized.

Figure 7:
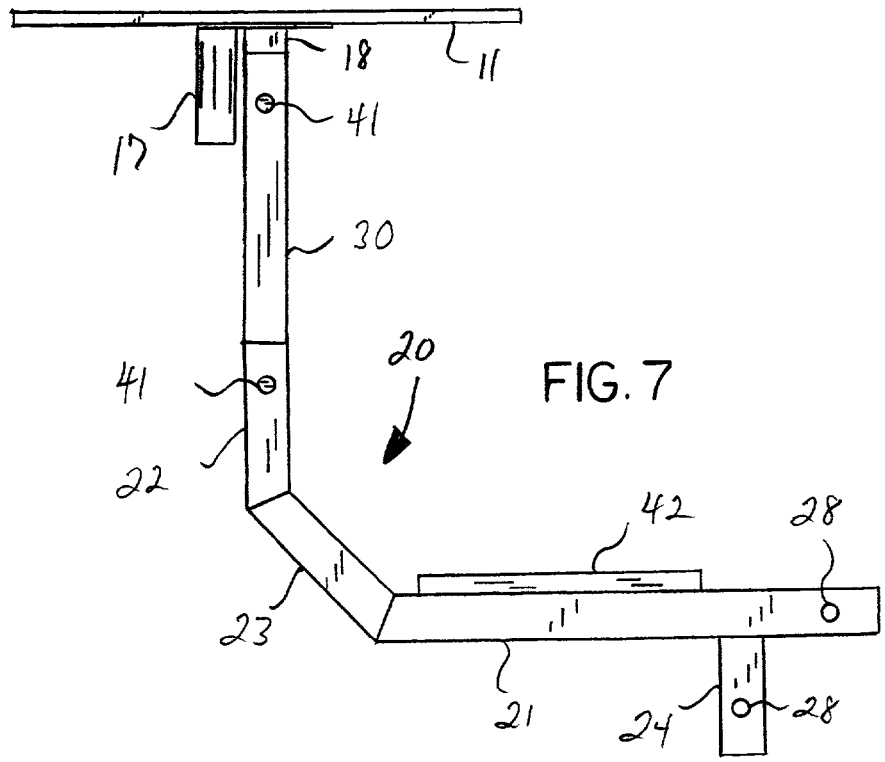
FIG. 7 is a side view showing the support member and table assembly in an extended height, middle distance configuration, with the extension member positioned vertically, with the table in the use position and a platform for supporting other objets is attached to the first segment.

Optionally, as seen in FIG. 10, an extension member 30' of somewhat greater length than extension member 30 may be provided, the extension member 30' being configured similar to extension member 30 with regard to locking apertures 33', receiving opening 32' and insertion member 31', where the extension member 30' further comprises a platform member 42 mounted thereon. Platform member 42, which may comprise a solid surface, a grate, individual structural beams, etc., provides a means for attachment of other objects during use or transport, such as a cooler, grill, lawn chairs, etc. Platform member 42 may also be attached directly to first segment 21 of support member 20, as shown in FIG. 7.

The table assembly 10, support member 20 and extension member 30 may be joined in various configurations, where the particular components used and their orientation determines the location of the table 11 relative to the vehicle and the ground, as well as determining the lateral separation distance of the vertical components of the support member 20 from the rear of the vehicle. This is important to account for situations where the invention is utilized with a vehicle having an externally mounted spare tire, rear door, hatchback or tailgate and where it is desired that access to and use of the spare tire, rear door, hatchback or tailgate not be impeded. Various possible configurations are shown in FIGS. 5 through 9.

Figure 6:
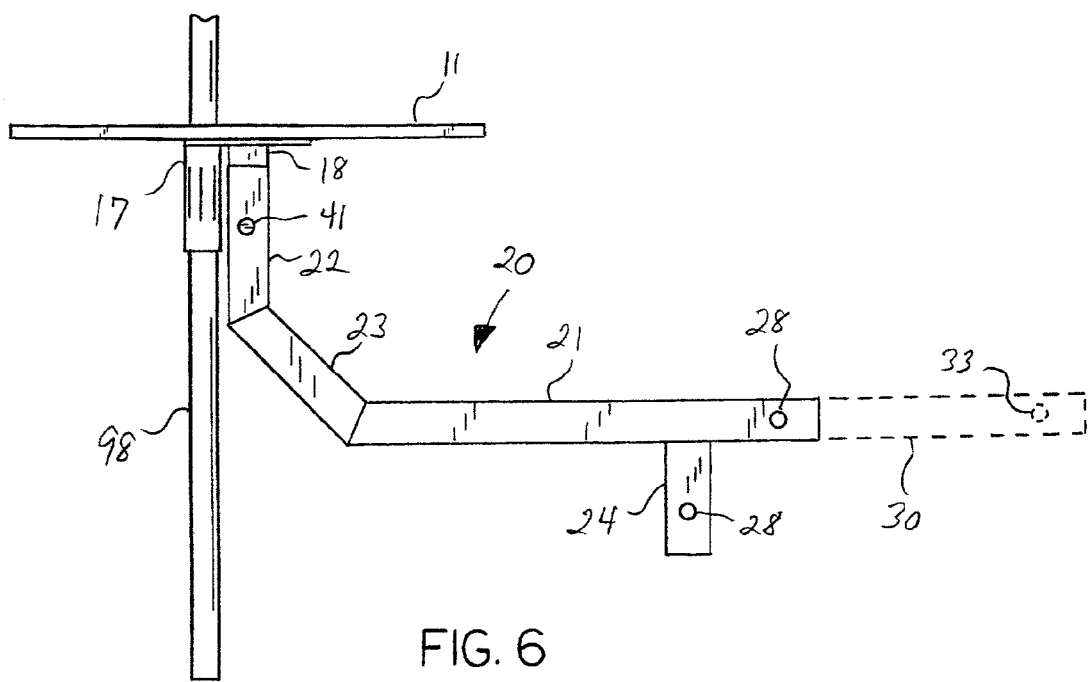
FIG. 6 is a side view showing the support member and table assembly in a low height, middle distance configuration, and showing an umbrella pole inserted through the table, with the table in the use position. Dashed lines indicate the use of the extension member to provide for an extended distance configuration.

With reference to FIGS. 5 and 6, a low table height, middle lateral distance configuration is shown. Here, the first segment 21 is disposed horizontally and is to be connected to the trailer hitch 99, and the table assembly 10 is mounted to the vertically disposed second segment 22. To provide for more space between the table 11 and the rear of the vehicle, the extension member 30 may be horizontally connected between the first segment 21 and the trailer hitch 99, as shown by the dashed lines in FIG. 6. FIG. 7 shows a configuration for an extended table height, middle lateral distance configuration, where the extension member 30 is connected vertically between the vertically disposed second segment 22 and the table assembly 10.

Figure 8:
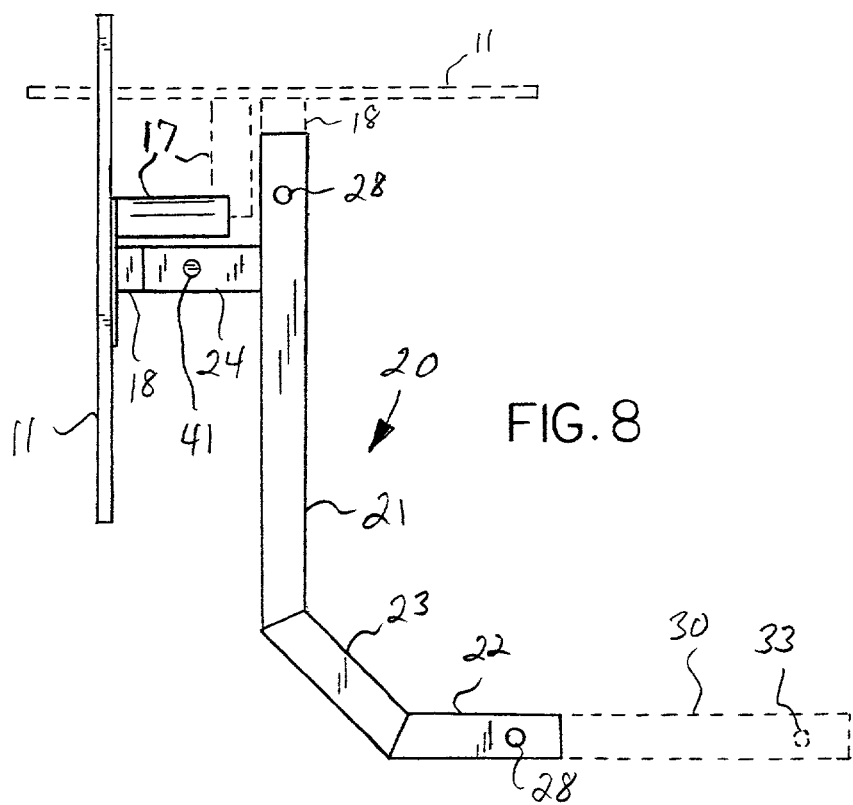
FIG. 8 is a side view showing the support member and table assembly in an extended height, close distance configuration, with the table shown in the transport position as secured to the transport segment. Dashed lines indicate both the use of the extension member to provide for a middle distance configuration and the table in the use position.

FIG. 8 shows a transport configuration of particular use when the vehicle is in motion and the table assembly 10 is not in use, where the second segment 22 is horizontally disposed and is to be connected to the trailer hitch 99, and the table assembly 10 is connected to the horizontally disposed transport segment 24 with the table 11 and first segment 21 vertically oriented. Dashed lines also show the table assembly 10 in a possible use position as mounted onto the vertically disposed first segment 21, which provides an extended table height and close lateral distance from the vehicle. The extension member 30 may be horizontally connected between the second segment 22 and trailer hitch 99, as shown by dashed lines, to create a greater lateral distance, or the extension member 30 may be vertically connected between the first segment 21 and the table assembly 10 to provide a maximum extended table height.

FIG. 9 shows an alternative transport configuration, where the transport segment 24 is horizontally disposed and is to be connected to the trailer hitch 99, and the table assembly 10 is connected to the horizontally disposed second segment 24 with the first segment 21 and table 11 vertically oriented. Extension member 30 may be horizontally connected between the transport segment 24 and the trailer hitch 99, as shown by the dashed lines, to increase the lateral separation distance if desired.

FIG. 11 illustrates an additional optional component of the system of the invention, which is a mounting sleeve member 50 having a square profile central body 51 defining a receiving bore 52, and a pair of oppositely extending square profile receiving members 53 with receiving openings 55 and locking apertures 54. The receiving bore 52 is sized to be able to fit around the first segment 21, second segment 22 or transport segment 24 in order to provide extra receiving openings 55 for retaining accessories. The mounting sleeve member 50 may be mounted onto a vertical or horizontal component of the support member 20.

It is understood that equivalents and substitutions for certain elements and components set forth above may be obvious to those skilled in the art, and therefore the true scope and definition of the invention is to be as set forth in the following claims.

I claim:

1. A combination table assembly and trailer hitch support member adapted for attachment to a vehicle-mounted trailer hitch, said combination comprising:
    a support member, said support member comprising a first segment, a second segment shorter than said first segment, and a transport segment shorter than said first segment, said second segment being disposed perpendicularly to said first segment, said transport segment perpendicularly joined to said first segment and extending in the opposite direction to said second segment;
    each said first segment, said second segment and said transport segment having a support member coupling means adapted for attachment to a vehicle-mounted trailer hitch, such that either said first segment, said second segment or said transport segment is directly attachable to such vehicle-mounted trailer hitch, wherein said support member coupling means each comprise a square profile receiving opening;
    a table assembly comprising a table and a table mounting bracket joined to said table, said table mounting bracket comprising table coupling means adapted for connecting said table to any of said support member coupling means, wherein said table coupling means comprises a square profile insertion member;
    and further comprising a mounting sleeve comprising a central body having a square profile central bore and a pair of square profile receiving members mounted in opposing manner to said central body, wherein said mounting sleeve may be disposed onto said first segment, said second segment or said transport segment.

2. The combination of claim 1, wherein said table coupling means further comprises a second square profile insertion member which is perpendicular to said square profile insertion member.

3. The combination of claim 1, said table assembly further comprising a pole receiving aperture.

4. The combination of claim 1, further comprising a bridging segment connecting said first segment to said second segment.

5. The combination of claim 4, wherein said bridging segment is joined to said first segment and to said second segment at a 45 degree angle.

6. The combination of claim 5, wherein said support member coupling means and said table coupling means further comprise locking apertures.

7. The combination of claim 1, further comprising an extension member comprising extension member coupling means comprising a square profile insertion member and a square profile receiving member, said extension member coupling means adapted for connecting said extension member to said support member coupling means, said table assembly coupling means or such vehicle-mounted trailer hitch.

8. The combination of claim 7, further comprising a platform connected to said extension member.

9. A trailer hitch support mount for supporting accessories on the rear of a vehicle having a trailer hitch, said trailer hitch support mount comprising:

a first segment having a square profile receiving opening;

a second segment joined to said first segment, said second segment having a square profile receiving opening, said second segment being shorter than said first segment, said second segment being perpendicular to said first segment;

a transport segment joined to said first segment, said transport segment having a square profile receiving opening, said transport segment being shorter than said first segment, said transport segment being perpendicular to said first segment, said transport segment extending in a direction opposite to said second segment;

wherein said first segment receiving opening, said second segment receiving opening and said transport segment receiving opening are the same size;

and further comprising a separable mounting sleeve comprising a central body having a square profile central bore and a pair of square profile receiving members mounted in opposing manner to said central body, wherein said mounting sleeve may be disposed onto said first segment, said second segment or said transport segment.

10. The mount of claim 9, further comprising a separable extension member, said extension member comprising a square profile insertion member sized for mating connection with said first segment receiving opening, said second segment receiving opening or said transport segment receiving opening, and a square profile receiving opening equal in size to said first segment receiving opening, said second segment receiving opening and said transport segment receiving opening.

11. The mount of claim 9, wherein said first segment receiving opening, said second segment receiving opening and said transport segment receiving opening are approximately one and ¾ inches by one and ¾ inches in size.

12. The mount of claim 9, wherein said first segment is joined to said second segment by a bridging segment.

13. The mount of claim 12, wherein said bridging segment is joined to said first segment at a 45 degree angle, and wherein said bridging segment is joined to said second segment at a 45 degree angle.

14. A combination trailer hitch support mount and accessory assembly supported thereby, said combination comprising:

a trailer hitch support mount comprising:

a first segment having a square profile receiving opening;

a second segment joined to said first segment, said second segment having a square profile receiving opening, said second segment being shorter than said first segment, said second segment being perpendicular to said first segment;

a transport segment joined to said first segment, said transport segment having a square profile receiving opening, said transport segment being shorter than said first segment, said transport segment being perpendicular to said first segment, said transport segment extending in a direction opposite to said second segment;

wherein said first segment receiving opening, said second segment receiving opening and said transport segment receiving opening are the same size;

whereby said first segment receiving opening, said second segment receiving opening and said transport segment receiving opening define coupling means each adapted to connect said support mount to a square profile vehicle-mounted trailer hitch; and an accessory assembly comprising:

a square profile insertion member sized to be received in mating manner by said first segment receiving opening, said second segment receiving opening or said transport segment receiving opening to connect said accessory assembly to said trailer hitch support mount;

and further comprising a separable mounting sleeve comprising a central body having a square profile central bore and a pair of square profile receiving members mounted in opposing manner to said central body, wherein said mounting sleeve may be disposed onto said first segment, said second segment or said transport segment.

15. The combination of claim 14, further comprising a separable extension member, said extension member comprising a square profile insertion member sized for mating connection with said first segment receiving opening, said second segment receiving opening or said transport segment receiving opening, and a square profile receiving opening equal in size to said first segment receiving opening, said second segment receiving opening and said transport segment receiving opening.

* * * * *